No. 653,529. Patented July 10, 1900.
C. W. RICHARDS.
AUTOMATIC PIANO OR ORGAN PLAYER.
(Application filed Feb. 3, 1900.)
(No Model.) 6 Sheets—Sheet 1.
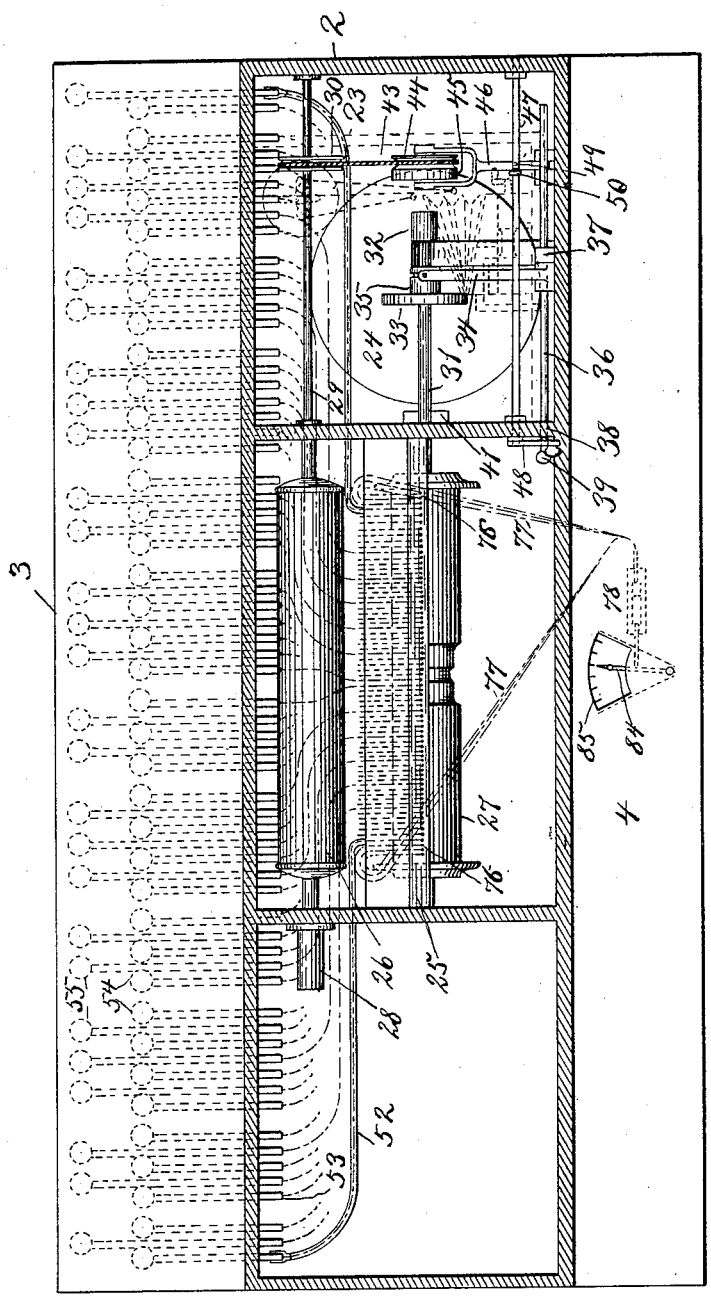
Fig. I

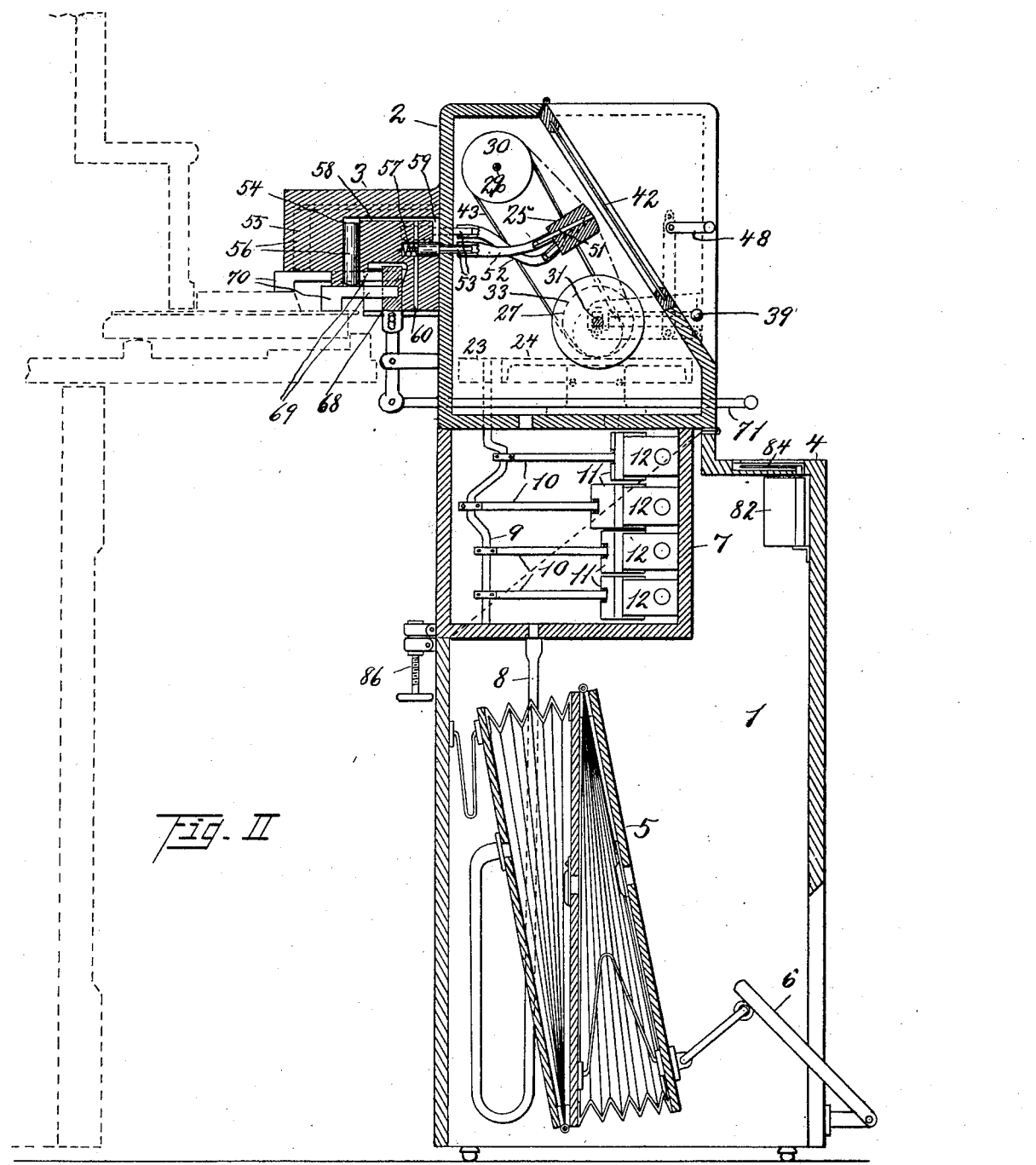

No. 653,529. Patented July 10, 1900.
C. W. RICHARDS.
AUTOMATIC PIANO OR ORGAN PLAYER.
(Application filed Feb. 3, 1900.)
(No Model.) 6 Sheets—Sheet 3.
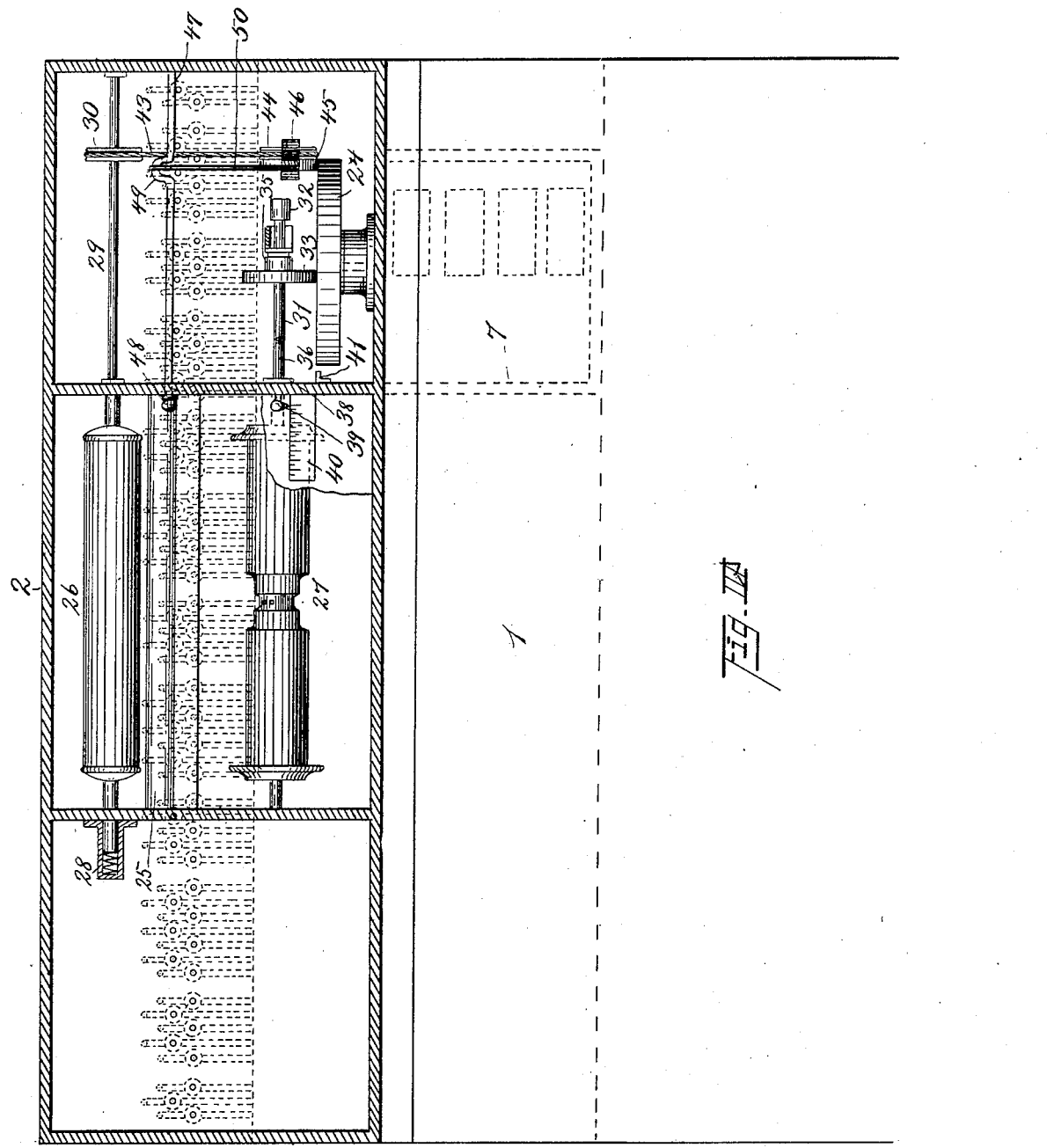
Fig. III.

No. 653,529. Patented July 10, 1900.
C. W. RICHARDS.
AUTOMATIC PIANO OR ORGAN PLAYER.
(Application filed Feb. 3, 1900.)
(No Model.) 6 Sheets—Sheet 4.
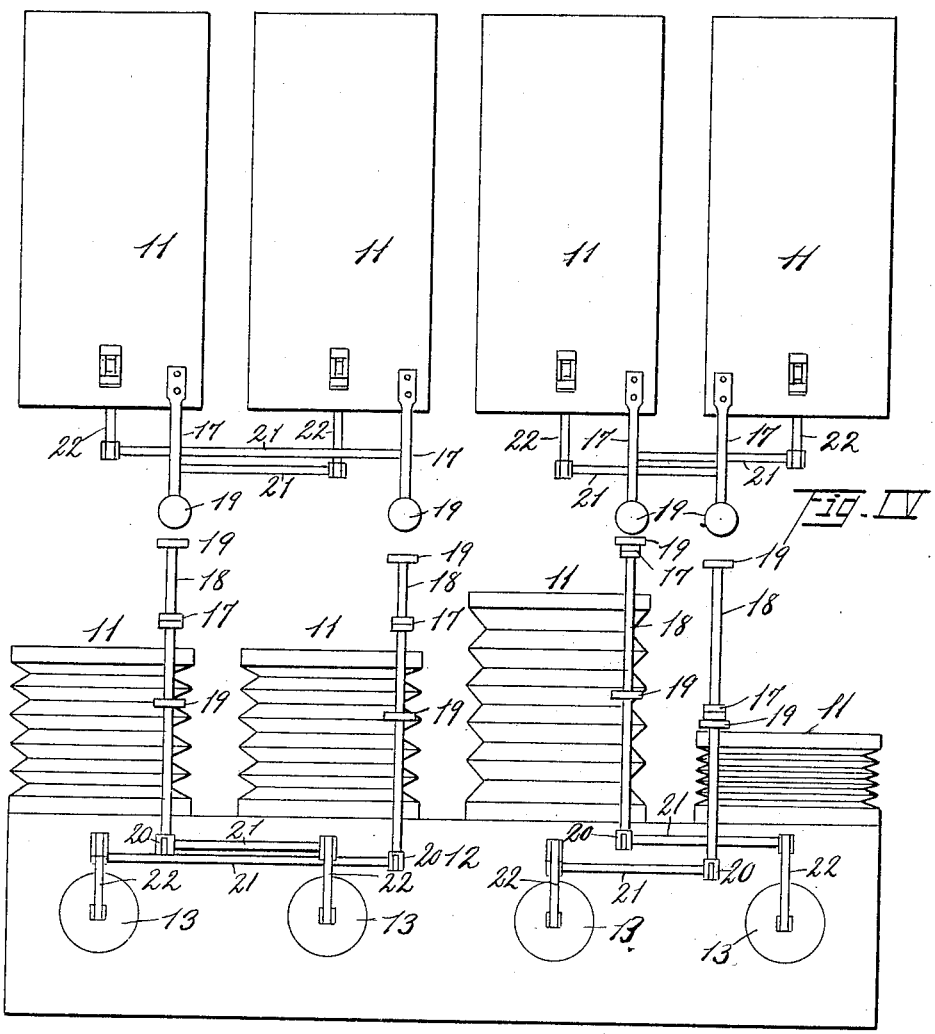
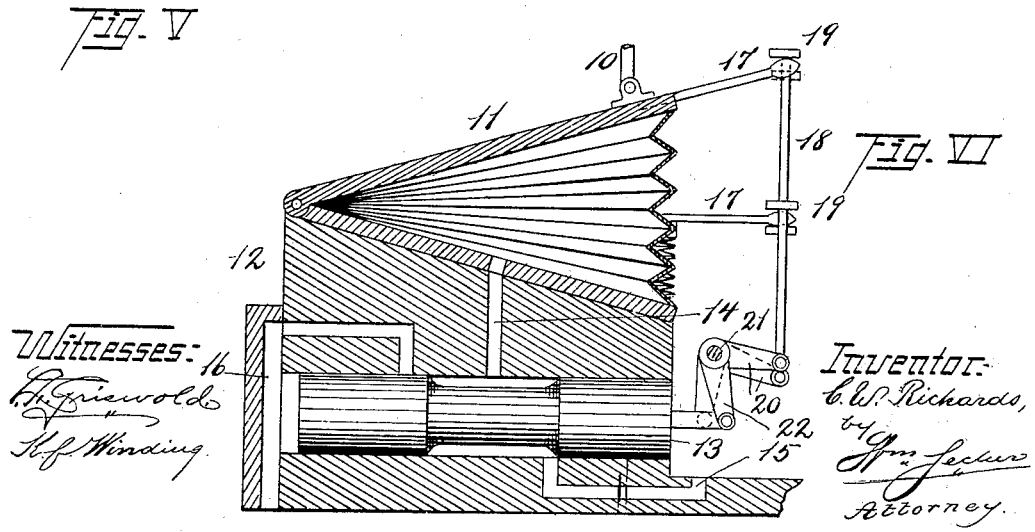
Witnesses:
Inventor:
C. W. Richards,
Attorney.

No. 653,529. Patented July 10, 1900.
C. W. RICHARDS.
AUTOMATIC PIANO OR ORGAN PLAYER.
(Application filed Feb. 3, 1900.)
(No Model.) 6 Sheets—Sheet 5.
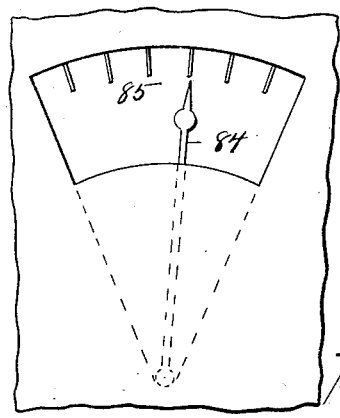
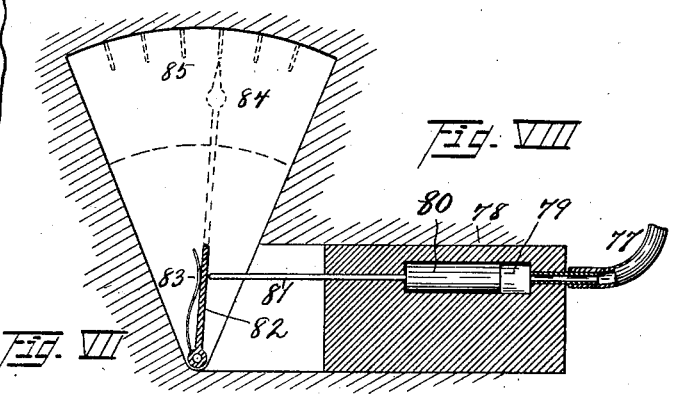
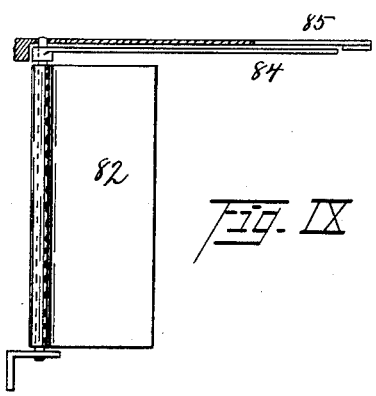
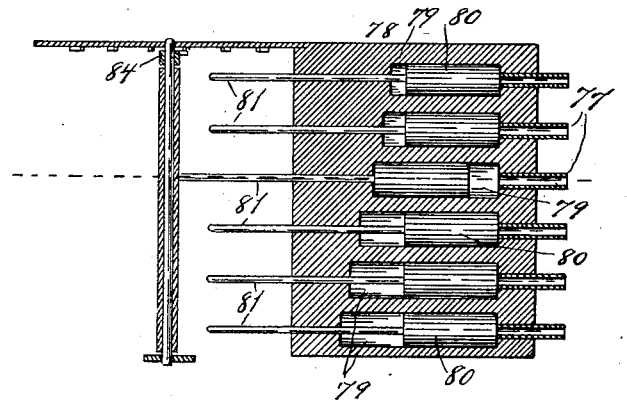
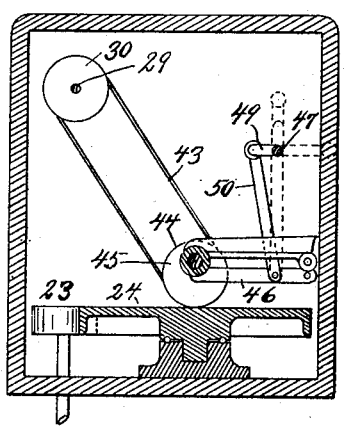
Witnesses: Inventor:
C. W. Richards, No. 653,529. Patented July 10, 1900.
C. W. RICHARDS.
AUTOMATIC PIANO OR ORGAN PLAYER.
(Application filed Feb. 3, 1900.)
(No Model.) 6 Sheets—Sheet 6.
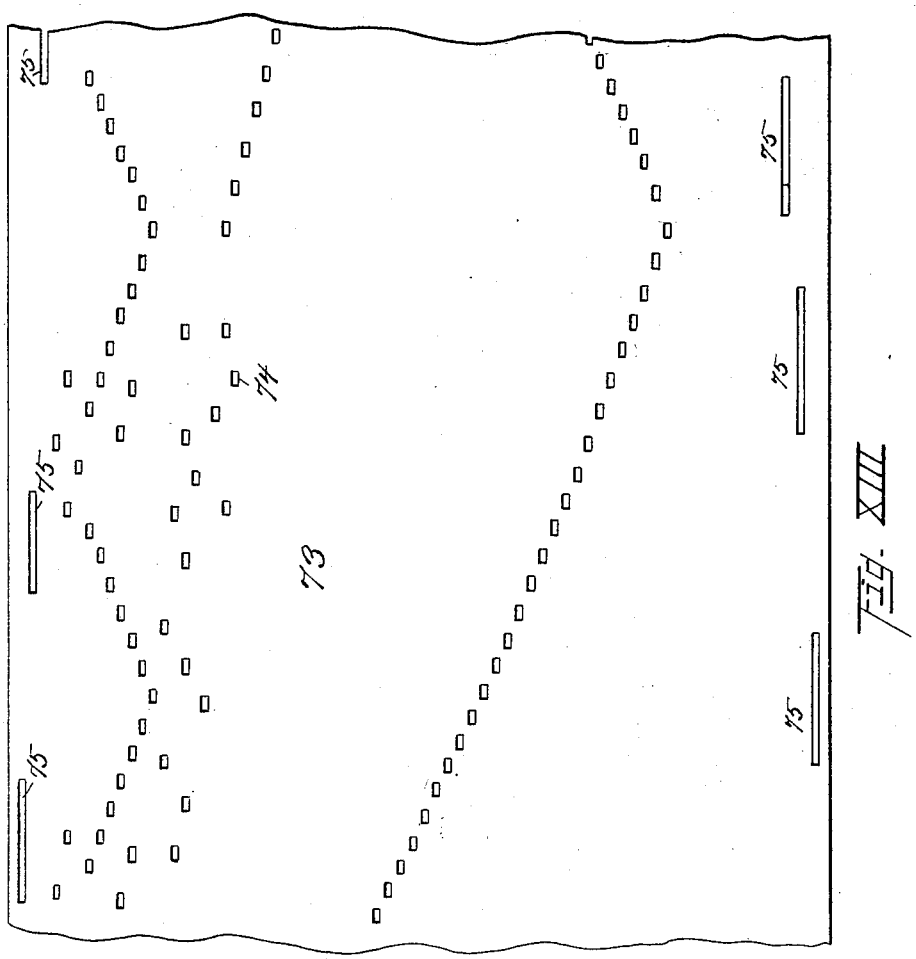
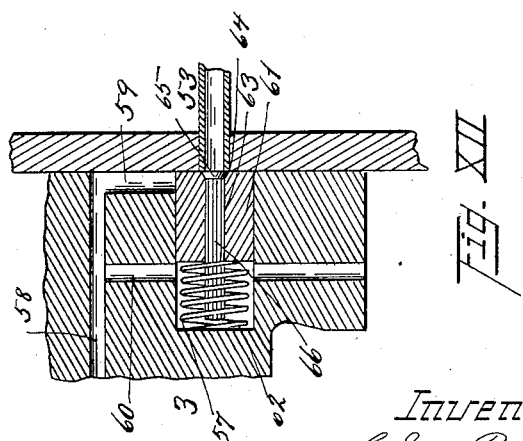

UNITED STATES PATENT OFFICE.

CHARLES W. RICHARDS, OF CLEVELAND, OHIO.

AUTOMATIC PIANO OR ORGAN PLAYER.

SPECIFICATION forming part of Letters Patent No. 653,529, dated July 10, 1900.

Application filed February 3, 1900. Serial No. 3,772. (No model.)

*To all whom it may concern:*

Be it known that I, CHARLES W. RICHARDS, a citizen of the United States, and a resident of Cleveland, county of Cuyahoga, and State of Ohio, have invented certain new and useful Improvements in Automatic Piano or Organ Players, of which the following is a specification, the principle of the invention being herein explained and the best mode in which I have contemplated applying that principle so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a top plan view of my improved automatic musical apparatus, showing the upper casing in horizontal section and showing the tubes leading from the tracker-board to the pneumatics in dotted lines; Fig. II, a vertical section of the apparatus, showing the forward portion of a piano to which the apparatus is applied in dotted lines; Fig. III, a front view of the apparatus, showing the front of the upper casing removed; Figs. IV and V, respectively, a plan view and an end view of the motor-bellows; Fig. VI, a section of one of said bellows and its valve mechanism. Figs. VII, VIII, IX, and X, respectively, a top plan view, a horizontal section, a side view, and a vertical section of the expression-indicating mechanism; Fig. XI, a vertical section of the upper casing, illustrating the music-sheet-rewinding mechanism; Fig. XII, an enlarged section of the valve mechanism for one of the key-operating pneumatics, and Fig. XIII a plan view of a portion of the music-sheet.

The device embodying this invention belongs to that class of separate and detachable apparatus which may be placed against the manual or keyboard of an organ or piano to automatically operate the keys of the same and in which the playing mechanism is controlled by a traveling perforated sheet or band.

The apparatus has a supporting-casing 1, preferably mounted on casters for convenient moving of the apparatus toward and from the instrument. A casing 2, which contains the playing mechanism, is hinged at its lower forward corner to the top of said supporting-casing and has an overhanging portion 3, which extends over the keyboard of the instrument when the apparatus is in its operative position. The upper casing is so hinged and supported upon the lower casing that a ledge 4 is formed, upon which the operator may rest his arms while manipulating the several devices regulating and controlling tempo, expression, &c. Suitable bellows 5 or other mechanism for compressing air are supported in the lower casing and are actuated by means of treadles 6 in the usual manner. A small motor-casing 7 is supported beneath the upper casing, near one end of the same, and said two casings are air-tight and communicate with each other. A flexible tube 8 or similar connection conveys the compressed air from the blowing mechanism to the motor-casing. A shaft 9, having a series of cranks, is vertically journaled in said motor-casing, and a number of pitmen 10 are pivoted to said cranks and to the movable leaves of a number of bellows 11. In the illustrated apparatus there are four bellows, pitmen, and cranks, and the latter are placed at right angles to each other. The stationary leaf of each bellows is secured to a valve-block 12, having a cylindrical valve-chamber in which a two-piston valve 13 slides. A channel 14 leads from the middle of the valve-chamber to the interior of the bellows, and two channels 15 and 16 lead, respectively, from ports in the valve-chamber, one port at each side of the port of the channel 14 to the interior and exterior of the motor-casing. Each of the bellows has an eye 17 upon the edge of the movable leaf which moves upon a rod 18, supported to longitudinally slide and provided with two stops 19, which may respectively be engaged by the eye to shift the rod at the extremes of the movement of the bellows-leaf. The end of said sliding rod is pivoted to an arm 20 upon a rock-shaft 21, which has an arm 22 pivoted to one of the valves. The leaf and rod of each one of the bellows are connected by this arm and rock-shaft mechanism to the valve of another bellows diametrically opposed to it in such manner that the valve for one bellows will be shifted by another bellows. The connection is such that the bellows will be inflated and collapsed in rotation, so that they will rotate the crank-shaft by their pitman connection. The pressure of the air in the motor-casing will tend to compress and deflate the bellows, and when the valve is shifted so as to bring the interior of the bellows in communication with the exhaust the force of the compressed air will deflate the bellows and draw upon the crank through the pitman, rotating the shaft. When the valve is shifted to connect the interior of the bellows with the interior of the motor-casing, the pressure upon both sides of the movable leaf is equalized, and the rotation of the crank-shaft will draw the leaf out by its pitman. In this manner the motor of the apparatus is actuated by the air compressed by the foot-bellows. A friction-pulley 23 is secured in the upper casing upon the upper end of the crank-shaft, and said pulley engages the periphery of a large horizontally-journaled drive-pulley 24. A tracker-board 25 of the usual construction is supported in the upper casing, and a music-roll 26 is suitably supported above and to the rear of said tracker-board. A take-up roll 27 is journaled below and forward of the tracker-board, so that the perforated music sheet or band may be drawn over said tracker-board from one roll to the other. The music-roll being interchangeable is removably supported at one end in a spring-support 28, permitting the insertion and removal of the roll, and at the other end in a shaft 29, having a pulley 30. The take-up roll has a suitable hook or button for the attachment of the end of the music-sheet and has its shaft 31 extending to one side over the drive-pulley, where it is preferably provided with a weight 32. A friction-disk 33 slides upon and rotates with the roll-shaft and engages the upper face of the drive-pulley. An arm 34 engages a grooved hub 35 of said disk and projects from a rod 36, sliding in bearings 37 and 38, respectively, upon the front wall of the upper casing and in the side wall of the recessed front of said casing. The end of said rod has a suitable handle or knob 39, by means of which it may be moved, and an index-finger which points to a scale 40, so that the position of the friction-disk in its radial relation to the drive-pulley may be ascertained and adjusted. As the drive-pulley revolves and the friction-disk is driven by the same the speed of the disk may be increased or decreased by bringing it farther from or nearer to the center of the pulley. As the feed of the music-sheet is governed by the speed of the friction-disk and said feed governs the tempo in which the apparatus is operated, the above-described device constitutes the tempo-regulating device. A small shelf 41 is secured upon the side wall of the recess in the casing, adjoining the periphery of the drive-pulley and at a level with the upper face of the same, so that the friction-disk may be slid from off the face of the pulley and rest upon the shelf when the take-up roll is to be stopped. The weight upon the end of the shaft for said roll serves to insure frictional bearing of the disk against the face of the pulley. The above-mentioned recess in the front of the upper casing is formed at the middle of the same, and the front of said recess is closed by a door 42, preferably glazed, and hinged at its upper end, so as to admit of access to the rolls and music-sheet. The joints of said door are suitably tightened to make it fit air-tight, and a suitable lock is provided to hold the door tightly closed. A band 43 passes around the pulley upon the music-roll shaft and around a pulley 44, which is concentric with and joined to a friction-disk 45, which may engage the face of the drive-pulley near the periphery of the same. Said disk and pulley are journaled in the end of an arm 46, pivoted upon the front wall of the upper casing, so that the disk may be dropped into engagement with and be raised out of engagement from the drive-pulley. A rock-shaft 47 is journaled in the upper casing and has a handle 48 upon its end upon the side wall of the recess and a crank 49, to which a link 50 is pivoted, the lower end of which link is pivoted to the arm supporting the disk and pulley, so that said arm, disk, and pulley may be raised and lowered by rocking the handle and rock-shaft. When the end of the music-sheet has been reached, the tempo-rod is slid to bring the friction-disk out of engagement with the drive-pulley, whereupon the swinging friction-disk is dropped down upon the drive-pulley, which will cause said disk to revolve the music-roll and again wind the music-sheet upon the music-roll. The tracker-board 25 is of the usual construction and has channels 51, corresponding to the number of keys upon the instrument to be played. A tube 52 extends from the rear end of each of said channels to a corresponding nipple 53 upon the rear wall of the upper casing. The overhang 3 upon the rear of the casing is formed with two rows or banks of vertical cylinders 54 and 55, corresponding to and registering with the white and black keys of the keyboard or manual. Plungers 56 fit to slide in said cylinders. A cylindrical valve-chamber 57 is formed at the inner end of each nipple, and a channel 58 leads from the upper end of the plunger-cylinder and has a vertical inlet-channel 59 communicating with the forward end of the valve-chamber and a vertical exhaust-channel 60 communicating with and intersecting the valve-chamber at about its middle and opening through the under side of the overhang. A cylindrical valve 61 fits in the valve-chamber and has a spring 62 bearing against it and the bottom of the valve-chamber to force it against the end of the inlet-nipple and over the port of the inlet-channel. An axial bore 63 is formed through said valve and has a valve-seat 64 at the forward end. A relief-valve 65 fits upon said seat and has a winged stem 66 in the bore, which stem projects beyond the rear end of the distributing-valve. A bar 68 is supported at its ends to slide in a horizontal plane under the overhang, and said bar has two rows of perforations in its rear face. Spring-stems 69 of the fingers or hammers are inserted in said bores and have their heads 70 adapted to extend immediately above and almost in contact with the keys of the instrument to be played upon. Said fingers, as illustrated, are made from soft rubber; but the stems may be made from metal or other springs and the heads from rubber, felt, or other soft and slightly-yielding material. A rod 71 is connected to the horizontally-sliding bar, so that said bar and the key-operating fingers may be moved forward and back to bring the fingers to be struck by the plungers nearer to or farther from their inner and fastened ends or fulcra and to cause said fingers to strike the keys farther from or nearer to their free ends. The sliding bar may be directly connected to the operating-rod, or it may be connected to said rod, as illustrated in the drawings, by means of a lever fulcrumed upon the casing and having one end pivoted to the bar and the other end pivoted to the rod. The music sheet or band 73 has the usual perforations and slots 74, which serve to admit air through the channels in the tracker-board to operate the key-actuating mechanism, and has, furthermore, at each edge three rows of perforations or slots 75, the purpose of which will presently appear. The tracker-board has at each end three channels 76, from which tubes 77 extend to a block 78, supported in the lower casing beneath the ledge. Said block has six cylindrical bores 79, into the ends of which the tubes open. Said bores are of increasing lengths, and pistons 80 are fitted to slide in the same. Each piston has a rod 81 projecting through the end of the bore. A plate 82 is pivoted at one edge to be engaged and tilted by the piston-rods, and a spring 83 bears against said rocking plate to force the same against the piston-rods. An index-finger 84 is secured upon the pivot of the plate and travels over the face of a dial-segment 85, disclosed through the top of the ledge. Air admitted through a perforation or slot in the music-sheet and a corresponding channel in the tracker-board passes through a tube to its corresponding piston-cylinder, where it forces a piston out and causes the rod of the latter to tilt the plate and index to the extent of the length of the cylinder. The index-finger will thus point to one of the marks upon the dial. Said marks indicate the expression desired for the music to be played and the strength of the tones—such as pianissimo, piano, mezzo-piano, mezzo-forte, forte, and forte-fortissimo—and the sheet is slotted or perforated to cause such indications to appear at the proper time and of the proper duration. In this manner the player may be advised as to the working of pedals or swells of the instrument and to the working of the rod which controls the expression or strength of the blow of the key-operating fingers.

As the upper casing is hinged at the front of the supporting-casing, the overhang, with the key-operating fingers, may be swung so as to accommodate them to keyboards of varying heights, and screws 86 or similar means may be provided between the supporting-casing and the sides of the upper casing to adjust and support said latter casing at the proper level.

In practice the apparatus is placed in front of the instrument to be played upon—piano or organ—and the overhang of the upper casing is adjusted over the keyboard of the instrument in such manner that each playing finger or hammer is placed over the corresponding key. The door in the recess of the upper casing is now opened, and the desired music-sheet upon its roll is placed with the trunnions of the roll in their proper supports. The music-sheet is then drawn over the tracker-board, and the end of the sheet is secured to the take-up roll. All of this part of the manipulation of the apparatus and the sheet is substantially the same as in other self-playing instruments of similar character. The door is now tightly closed, whereupon the tempo-regulating rod is slid by its handle to the point indicated upon the scale as corresponding to the tempo indicated upon the music sheet or roll or in which the piece is known to be played. The movement of the tempo-regulating rod moves the friction-disk nearer to or farther from the periphery of the drive-pulley, driving the former and the take-up roll with greater or less speed when the pulley is revolved. The treadles are now operated, working the bellows, which blow air into the motor-casing and thence into the upper casing. The compressed air in the motor-casing drives the bellows-motor, driving the sheet-feeding mechanism. The compressed air in the upper casing bears against the music-sheet and passes through the slots or perforations in the same, into and through the channels in the tracker-board thus uncovered, and through the corresponding tube or tubes to the piston-valves in the overhang. The air acting against one of said valves will force the same back against its spring, uncovering the inlet-channel to its respective plunger-cylinder and admitting air to said cylinder behind the plunger in the same and forcing such plunger down. The descending plunger strikes its playing-finger and depresses the same to strike its corresponding key. As soon as the air-supply is cut off by a solid portion of the music-sheet passing over the opening in the tracker-board the valve flies back, connecting the plunger-cylinder with the exhaust-channel and allowing the air in said cylinder to exhaust and the tension of the playing-finger to raise the plunger. As the piston-valve is forced back the stem of the small relief-valve in the same strikes the end of the valve-chamber and slightly opens said valve, admitting air to the rear of the piston-valve, thereby balancing the pressure upon the same, so that the spring may force it forward when the air-pressure is shut off, the air under pressure contained in the tube and against the valve and shut within said space by an imperforate portion of the music-sheet passing over the hole in the tracker-board being permitted to leak by the relief-valve and out through the exhaust-channel or leaking out through a suitable small hole in the tube or nipple and communicating with the atmosphere. The force of the blow of the plungers and playing-fingers may be regulated by sliding the bar which carries the playing-fingers forward or back. When the bar is slid outward, the plungers strike nearer to the fulcrum of the spring-stems, and consequently exert less force at the heads of the fingers, which also strike the keys farther from their ends and nearer their fulcra, thereby producing a lighter touch upon the keys. When the bar is slid inward, the plungers strike nearer the heads of the fingers, exerting more force, and the heads strike the keys nearer their ends and farther from their fulcra, thereby producing a stronger touch. The strength of touch may thus be varied, and a touch which resembles the touch of human fingers will be attained, rendering the action of the apparatus less mechanical and monotonous than the apparatus of this class which solely depends upon the pedals of the piano for the production of louder or weaker tones. Expression in the playing of the instrument may be produced by the operator in the same manner it is produced by the human fingers. As the music-sheet passes over the tracker-board the slots or perforations at the edges of the sheet admit air to the corresponding bores in the block of the expression-indicator, forcing out the respective pistons, and thus placing the indicator-pointer at the respective marks. When the end of the music-sheet is reached, the friction-disk of the take-up roll is slid off from the drive-pulley onto its shelf and the swinging friction-disk is lowered into engagement with the drive-pulley. Said disk will revolve, and thus drive the rewinding-pulley upon the music-roll shaft through its belt connection, rewinding the sheet upon the music-roll.

This style of apparatus has heretofore usually been operated by exhausting air from the interior of the operating elements, and thus causing the pressure of the outside atmosphere to be exerted upon the movable portions of the pneumatics. A small amount of leakage in any one of the elements will destroy the partial vacuum in the same and in the elements connected therewith and will thus, by nearly or completely balancing the difference of pressure, render such element either completely inoperative or at least cause the action of the same to be slow and inaccurate. By the use of compressed air for actuating the several parts of the apparatus I obtain a positive action of all parts of the apparatus and obtain a quicker action of the plungers actuating the key-fingers than the atmospheric pressure against a partial vacuum can exert. Bellows or diaphragms may be substituted for the several piston or plunger structures in the apparatus, either of such devices being broadly equivalent, although plungers and pistons may be preferable in certain of the devices on account of their guided movement, while bellows or diaphragms may be preferable in certain other devices on account of their tightness and quickness of response to slight changes of pressure upon their sides. The terms "plungers" or "plunger devices" may therefore be applied generically to the pneumatically-operated devices in the apparatus as descriptive of a device moved or operated by a change of the balance in air-pressure against its respective sides or a so-called "pneumatic," which term is generally used in this art to describe such device. The drive-pulley and friction-disk actuating the take-up roll admit of a gradual and varied scope of the speed of the music played, and the device controlling the leverage upon the playing-fingers of the operating-pneumatics, and consequently the blow upon the keys of the instrument, admits of a variety of shading in the expression of the music played which cannot be attained from the use of the pedals of the piano alone. By the use of rubber heads upon spring-fingers the action of such fingers upon the keys will be more like the action of the human fingers than the action of reciprocating plungers or rocking hammers, the action of which can only have the effect of mechanical percussion. The relation of the perforations or slots in the music-sheet controlling the expression-indicator to the perforations or slots controlling the playing mechanism is such that the expression-indicator will be operated sufficiently in advance of the production of the tone to enable the operator to properly work his expression-controlling devices. The glass door of the upper casing permits the operator to inspect the music-sheet, so as to read any instructions thereon and to observe when the end of the sheet is reached, that he may stop the feeding of the sheet and throw the rewinding mechanism into operation. By opening the door the compressed air is released, so that the feed mechanism will stop. This will prevent any movement of the sheet by the unwinding or rewinding mechanism while the roll and sheet are manipulated, and thus prevent any straining and tearing of the sheet, which may happen in apparatus operated by the exhaustion of air, in which an accidental pressure upon a bellows-treadle may start the mechanism again. Quick action of the key-operating plungers is insured by actuating them directly from the air-current passing through the music-sheet without intermediate valve mechanism controlling a separate air-current for the plungers or pneumatics. The playing-fingers have a permanent tendency to rise from the keys on account of their spring-stems, so that they will not engage the keys for a longer space of time than the air-current is admitted to their pneumatics, but will immediately rise when such current is cut off. This insures quick action without drag, and the resistance against depression of the fingers by the pneumatics being adjustable by sliding the bar admits of the fingers being more or less strongly forced down upon the keys.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. In automatic musical apparatus, the combination with a tracker-board, music-sheet-feeding mechanism, a pneumatic motor for operating the same, pneumatic tone-producing devices connected to the tracker-board, and a casing inclosing the tracker-board and motor, of means for supplying air under pressure into said inclosing casing, substantially as set forth.

2. In automatic musical apparatus, the combination with key-playing devices, pneumatics for operating the same, a tracker-board connected to control said pneumatics, music-sheet-feeding mechanism, a pneumatic motor for operating the same, and a casing inclosing the tracker-board and motor, of means for supplying air under pressure into said inclosing casing, substantially as set forth.

3. In automatic musical apparatus, the combination with a tracker-board, music-sheet-feeding mechanism, and a pneumatic motor for operating the same, of a casing inclosing said elements, means for supplying air under pressure into said casing to operate said elements, and a door in the casing arranged to provide access to the music-sheet-feeding mechanism and allowing the operating air-pressure to escape from within the casing when opened, substantially as set forth.

4. In automatic musical apparatus, the combination with a key-operating finger consisting of an elastic stem secured at one end and a head engaging the key, of a pneumatic having its movable member engaging the stem of said finger from above to depress it and the key, substantially as set forth.

5. In automatic musical apparatus, the combination with a key-operating finger having an elastic stem secured at one end and a head engaging the key, of a pneumatically-operated plunger supported above the stem of the finger to depress the same and the key, substantially as set forth.

6. In automatic musical apparatus, the combination with a key-operating finger formed from rubber and having an elastic stem secured at its end and a head engaging the key, of a pneumatic having its movable member engaging said finger from above to depress the same, substantially as set forth.

7. In automatic musical apparatus, the combination with a key-operating finger, of means for longitudinally moving such finger to cause it to strike the key nearer to or farther from the end of the same, substantially as set forth.

8. In automatic musical apparatus, the combination with a key-operating finger and a pneumatic engaging the same to rock it, of means for changing the relative positions of the striking-point of the pneumatic upon the finger and the fulcrum of the same and for changing the striking-point of the finger upon the key, substantially as set forth.

9. In automatic musical apparatus, the combination with a key-operating finger and a pneumatic engaging the same to rock it, of means for longitudinally moving said finger to cause the pneumatic to engage the same at varying distances from its fulcrum, substantially as set forth.

10. In automatic musical apparatus, the combination with a key-operating finger having an elastic stem and a head engaging the key, and a pneumatic arranged above said finger to engage the same with its movable member, of a support for the end of the stem of the finger, and means for moving said support and finger longitudinally to the latter, substantially as set forth.

11. In automatic musical apparatus, the combination of a support arranged to slide in a horizontal plane, means for moving said support, a key-operating finger having an elastic stem secured in the support and a head engaging the key, and a pneumatic having its movable member engaging the stem of said finger to depress the same and the key, the force of depression being regulated by the relative adjusted distance of the striking-point of the pneumatic and the fulcrum of the finger, substantially as set forth.

12. In automatic musical apparatus, the combination of a series of pneumatics, a bar supported parallel to said series to slide in a horizontal plane and in a direction transverse to its length, a series of key-operating fingers having elastic stems secured in said bar to project beneath the movable members of the pneumatics and having heads engaging the keys, and a rod connected to the bar to slide the same, whereby the fingers may be adjusted to be engaged by the pneumatics at varying distances from their fulcra and to strike the keys at varying distances from the ends of the latter, substantially as set forth.

13. In automatic musical apparatus, the combination with a drive-pulley having means for rotating it and formed with a friction-face, of a take-up roll, a shaft connected to rotate said roll and diametrical to the pulley, a friction-disk sliding upon and revolving with the roll-shaft and in engagement with the friction-face, means for sliding the friction-disk and holding the same in radial adjustment to the drive-pulley, and a support at the side of said pulley and upon which the disk may be moved from off the pulley and be supported, substantially as set forth.

14. In automatic musical apparatus, the combination with a drive-pulley having a friction-face and means for rotating it, music-sheet-winding mechanism frictionally driven from said pulley, and a band-pulley upon the music-roll shaft, of a friction-disk having a band-pulley, a swinging arm supporting said disk, a handle and link connection for raising and lowering said arm, and a band around the pulleys of the music-roll and friction-disk, substantially as set forth.

15. In automatic musical apparatus, the combination with a supporting-casing, of an upper casing containing the key-operating mechanism and hinged at the front of the supporting-casing to swing upward and forward, substantially as set forth.

16. In automatic musical apparatus, the combination with a supporting-casing, of an upper casing containing the key-operating mechanism and hinged at the front of the supporting-casing to swing upward and forward, and means for adjusting the rear portion of the upper casing up or down according to the height of the keyboard of the instrument to be played upon, substantially as set forth.

17. In automatic musical apparatus, the combination with a supporting-casing, of an upper casing containing the operating mechanism and having an overhang upon its rear side and the key-operating devices arranged beneath said overhang, said casing being hinged at its lower forward corner to the supporting-casing, and means for adjustably raising and lowering the free side of said upper casing to adjust the overhang and key-operating devices to the height of the keyboard of the instrument to be played upon, substantially as set forth.

18. In automatic musical apparatus, the combination with a tracker-board having passages additional to the music-controlling passages, and a music-sheet having slots and perforations corresponding to said additional passages, of an index, a series of pneumatics having increasing lengths of movement and connected to the index to move the same and connected to the additional channels in the tracker-board to be controlled from the same, substantially as set forth.

19. In automatic musical apparatus, the combination with a tracker-board having passages additional to the music-controlling passages, and a music-sheet having slots and perforations corresponding to said additional passages, of an index having a plate upon its pivot, a series of cylinders of increasing lengths, tube connection between each cylinder and a tracker-board passage, plungers in the cylinders and having bearing against the plate of the index, and a tension device exerting its tension in opposition to the plungers, substantially as set forth.

20. In automatic musical apparatus, the combination of a plunger-chamber, a plunger movable therein, a valve-chamber, a controlled live-air inlet opening into one end of said chamber, a channel extending from the plunger-chamber to the inlet end of the valve-chamber and having an exhaust-channel extending from it to the outer air through the middle of the valve-chamber, a plunger-valve in the valve-chamber and alternately opening and covering said channels, and a spring bearing against the valve to close the inlet and live-air channel, substantially as set forth.

21. In automatic musical apparatus, the combination of a plunger-chamber, a plunger movable therein, a valve-chamber, a controlled live-air inlet opening into one end of said chamber, a channel extending from the plunger-chamber to the inlet end of the valve-chamber and having an exhaust-channel extending from it to the outer air through the middle of the valve-chamber, a plunger-valve in the valve-chamber and alternately covering and uncovering said channels, a spring bearing against the valve to close the inlet and live-air channel, and a relief device admitting air behind the valve when the latter is forced back against the spring, substantially as set forth.

22. In automatic musical apparatus, the combination of a plunger-chamber, a plunger movable therein, a valve-chamber, a controlled live-air inlet opening into one end of said chamber, a channel extending from the plunger-chamber to the inlet end of the valve-chamber and having an exhaust-channel extending from it to the outer air through the middle of the valve-chamber, a plunger-valve in the valve-chamber and alternately covering and uncovering said channels, a spring bearing against the valve to close the inlet and live-air channel, and a relief channel and valve through the plunger-valve, said relief-valve having its stem projecting beyond the inner end of the plunger-valve to engage the end of the valve-chamber and open the relief-valve as the plunger-valve is forced back against the spring, substantially as set forth.

In testimony that I claim the foregoing to be my invention I have hereunto set my hand this 23d day of December, A. D. 1899.

CHARLES W. RICHARDS.

Witnesses:
WM. SECHER,
K. F. WINDING.